United States Patent

Ma

[11] Patent Number: 5,615,081
[45] Date of Patent: Mar. 25, 1997

[54] PORTABLE COMPUTER HAVING KEYBOARD STRUCTURE INCLUDING TWO SUB-KEYBOARDS MOUNTED FOR ROTATION BETWEEN A LONGITUDINALLY ALIGNED POSITION AND A MUTUALLY PARALLEL POSITION

[76] Inventor: Hsi-Kuang Ma, 4F, No. 48, Sec. 2, Chung Cherng Rd., Taipei, Taiwan

[21] Appl. No.: 594,463

[22] Filed: Jan. 31, 1996

[51] Int. Cl.$^6$ .............................. G06F 1/16; B41J 11/56; H05K 5/02
[52] U.S. Cl. ........................................ 361/680; 400/682
[58] Field of Search ..................... 364/708.1; 400/472, 400/479, 488–492, 682, 691–693; 395/168, 169; 200/5 A; 361/680, 683

[56] References Cited

U.S. PATENT DOCUMENTS

| 5,198,991 | 3/1993 | Pollitt | 361/680 |
| 5,534,891 | 7/1996 | Takano | 345/169 |
| 5,543,787 | 8/1996 | Karidis et al. | 361/680 X |

Primary Examiner—Michael W. Phillips
Attorney, Agent, or Firm—Bacon & Thomas

[57] ABSTRACT

A portable computer includes a mechanism for connecting two sub-keyboards to a mainframe to impart a rotary motion to the sub-keyboards so that the sub-keyboards may be opened outwardly to be in a longitudinally aligned state or closed inwardly to be in a parallel relationship.

4 Claims, 3 Drawing Sheets

PORTABLE COMPUTER HAVING KEYBOARD STRUCTURE INCLUDING TWO SUB-KEYBOARDS MOUNTED FOR ROTATION BETWEEN A LONGITUDINALLY ALIGNED POSITION AND A MUTUALLY PARALLEL POSITION

BACKGROUND OF THE INVENTION (a) Field of the Invention

The present invention relates generally to an improved portable computer, and more particularly to an improved portable computer with a means for connecting two sub-keyboards to the mainframe and for imparting rotary motion to the sub-keyboards.

(b) Description of the Prior Art

Portable computers are very popular nowadays because they are convenient to carry. However, a major problem with using portable computers is that their keyboards are comparatively smaller, so that the keys are consequently smaller. As a result, a user using the keyboard of a portable computer may not type as fast as with using a standard keyboard of a desk-top computer; typing errors may easily occur too.

In order to achieve good portability, the portable computer has to be compact in size. And since the keyboard is hingedly connected to the display of the portable computer and its size has to match the display, it has to be configured to be smaller than the standard keyboard of the desk-top computer. Manufacturers have been looking for solutions to overcome the above-mentioned problem with portable computers, but no feasible one has been offered.

Basically, for the size of the keyboard and the arrangement of the keys, there is a certain proportion in their length and width. Therefore, if the length of the keyboard is increased, the size of the individual keys may be enlarged. With the conventional keyboard for portable computers, since the length of the keyboard is restricted by the size of the computer, it is difficult to overcome the above-mentioned drawback. Hence, in order to achieve enlargement of the size of the individual keys, it is necessary to break through the existing principle of having the length of the keyboard to be the same as that of the display.

SUMMARY OF THE INVENTION

Accordingly, a primary object of the present invention is to provide a keyboard for portable computers consists of two sub-keyboards which are turnably opened or closed so as to increase the overall size of the keyboard.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
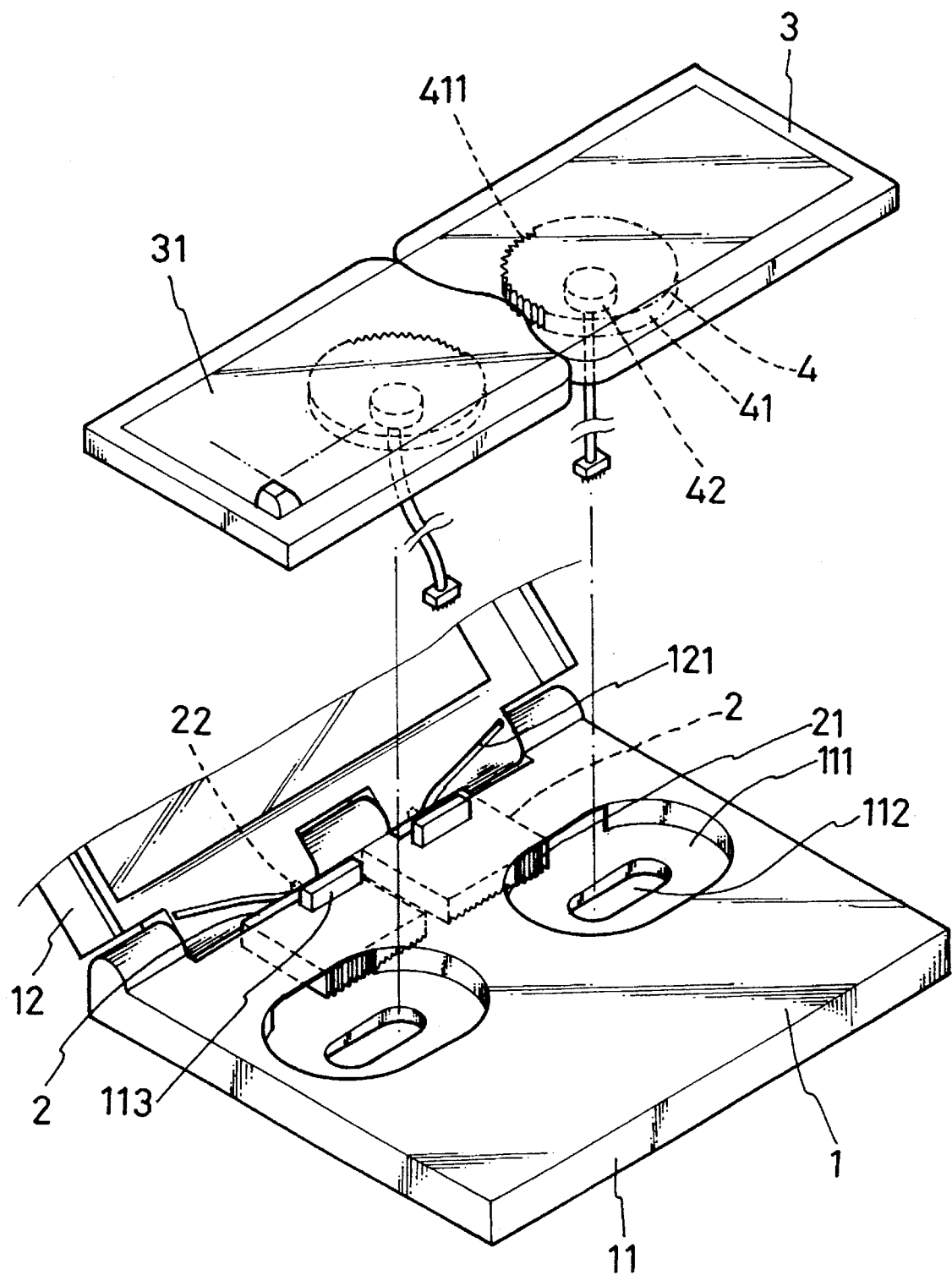
FIG. 1 is an exploded, elevational view of the present invention.

With reference to FIG. 1, a preferred embodiment of the keyboard for portable computers according to the present invention essentially comprises portable computer 1, two toothed blocks 2, two sub-keyboards 3 and two gears 4.

The portable computer 1 is a known device and consists of a mainframe 11 and a display 12, which are also well known in the art. A salient feature of the present invention resides in the configuration of the mainframe 11. The mainframe 1 is provided with two substantially elliptical depressions 111 for accommodating the gears 4 which may slidably displace therein. Each of the depressions 111 has an elongated elliptical shaft hole 112 formed therein for receiving a shaft 42 of each of the gears 4 so that the shaft 42 may slidably displace therein. Besides, near a pivot connecting the mainframe 11 with the display 12, the mainframe 1 is provided with two stop posts 113 integrally extending therefrom for guiding the sub-keyboard as they are moved into and out of a longitudinally aligned position. Furthermore, the display 12 is provided with two symmetrical key slots 121 respectively disposed on both sides near the pivot connecting the mainframe 11 and the display 12. The key slots 121 are configured to extend obliquely upward from a lower portion of the display for respectively receiving a projection 22 of the toothed blocks (to be described hereinafter) to perform slidable displacement therein.

The toothed blocks 2 are block structures having a thickness corresponding to the height of the depressions 111 of the mainframe 11. Each of the toothed blocks 2 is provided with a plurality of teeth 21 equally spaced apart from each other such that the teeth 21 are located near a longer upper side of the shaft hole 112. Near the pivot of portable computer 1, the toothed block 2 is further provided with the above-mentioned projection 22 which may fit into the key slot 121 to slidably displace therealong so that the toothed block 2 may displace synchronously.

Basically, the sub-keyboards 3 are the two parts of an integral keyboard capable of being closed or opened. The sub-keyboards 3 are respectively consisted of a keyboard surface 31 provided with a plurality of keys thereon. In order that the sub-keyboards 3 may open or close smoothly, the dividing line therebetween is preferably configured to be curved such that the sub-keyboards 3 are tightly juxtaposed when they are opened. Besides, the sub-keyboards 3 are provided with necessary connecting lines at their respective bottom sides for joining the sub-keyboards 3 with the motherboard. Such a technique is well known in the art.

The gears 4 are connected to the bottom sides of the sub-keyboards 3 respectively. Each gear 4 consists of a larger gear ring 41 and the shaft 42. The outer diameter of the gear ring 41 matches that of the depression 111 so that it may be accommodated therein. The outer diameter of the shaft 42 corresponds to that of the shaft hole 112 so that it may be received therein. The gear ring 41 is provided with a plurality of teeth 411 at its periphery for engagement with the teeth 21 of the toothed block 2.

With reference to the drawings, in assembly, the connecting lines of the sub-keyboards 3 are linked to the mainframe 11 of the portable computer 1, and the sub-keyboards 3 are respectively disposed on the mainframe 11 by means of the gear rings 41 and the shaft 42 of the gears 4 which are respectively accommodated in the depressions 111 and the shaft holes 112 in the mainframe 11. The projections 21 of the toothed blocks 2 are respectively inserted into the corresponding key slots 121. After assembly, the teeth 21 of the toothed blocks 2 are in engagement with the teeth 411 of the gear rings 41.

Figure 2:
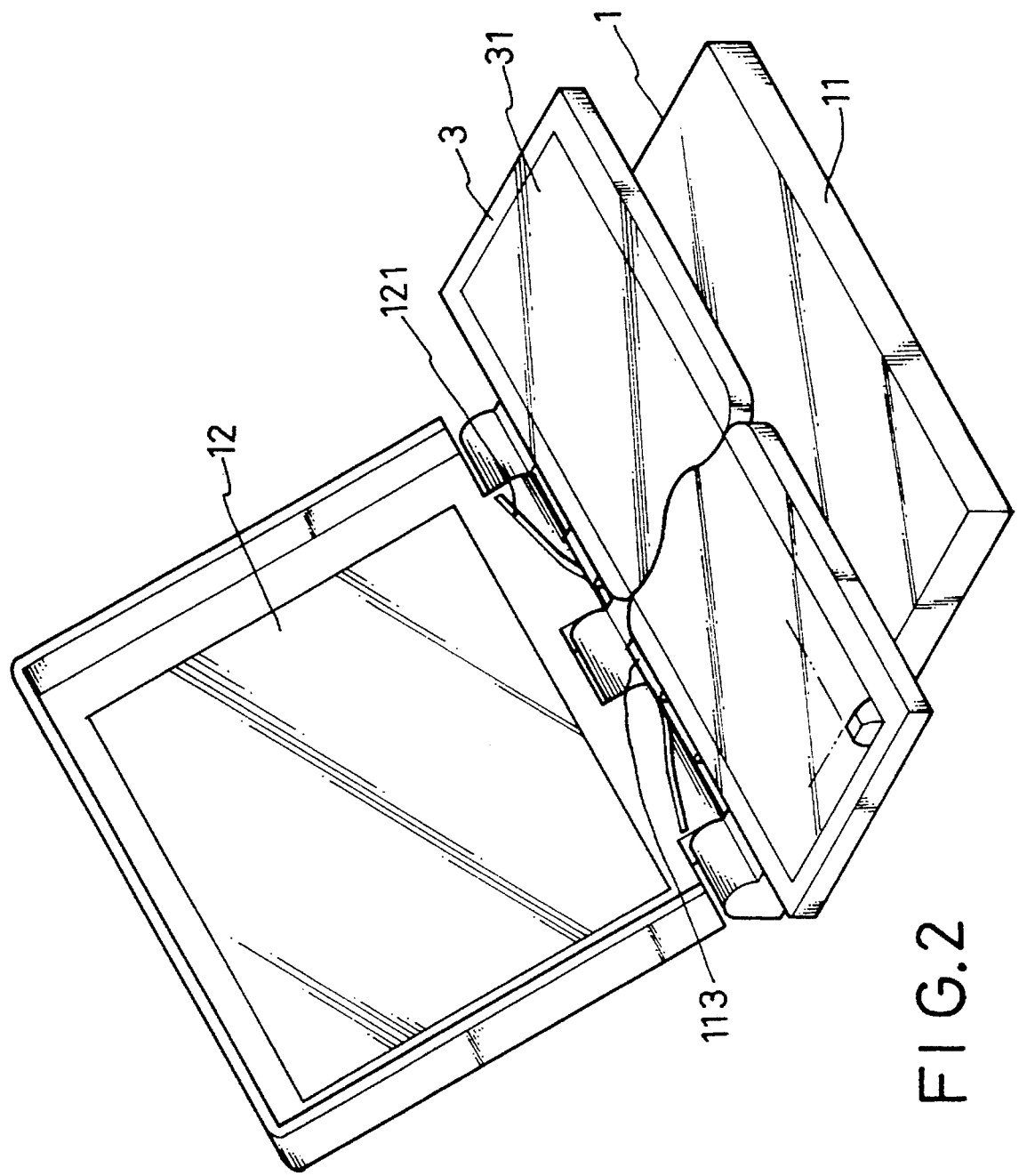
FIG. 2 is an exploded, elevational view of the present invention in an assembled state.
Figure 3A:
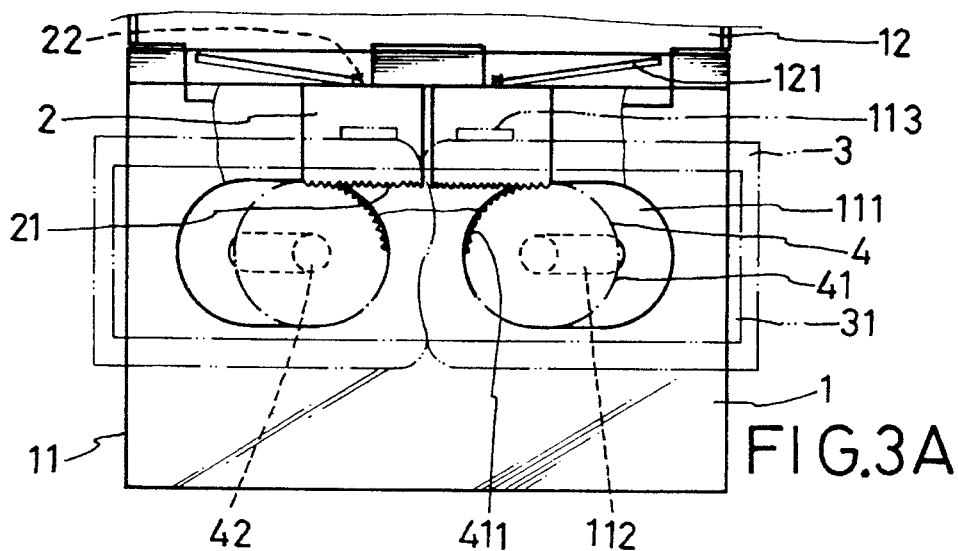
FIGS. 3A, 3B and 3C are schematic view of the operation of the means for imparting rotary motion to the sub-keyboards according to the present invention.
Figure 3B:
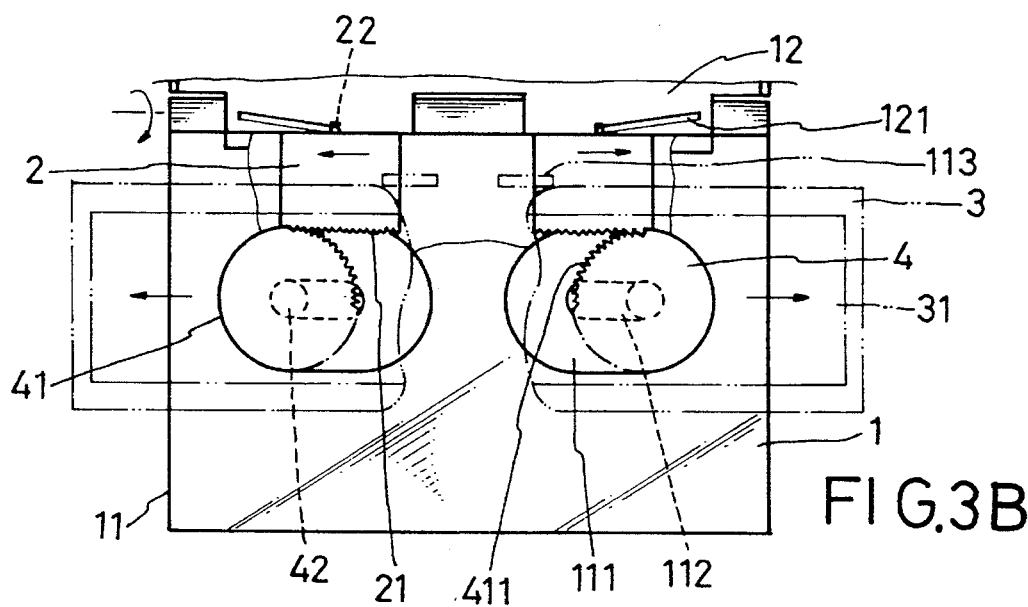
Figure 3C:
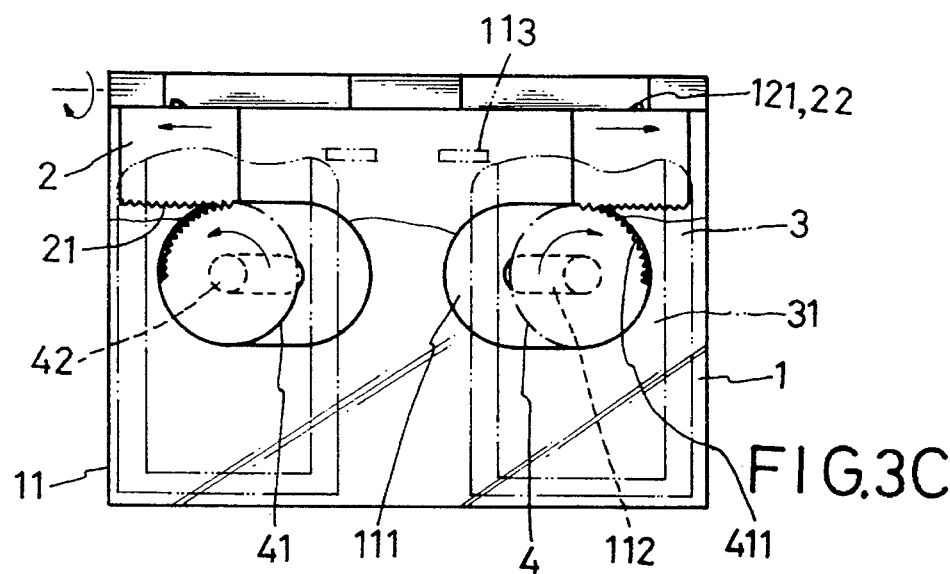

FIG. 2 shows the sub-keyboards 3 of the present invention in an opened state. With reference to FIG. 3*a*, when the sub-keyboards 3 are opened for manipulation, the projections 22 are located at the extreme bottom ends of the key slots 121, i.e., the toothed blocks 2 are located at a middle position. In order to close the sub-keyboards 3, the portable computer 1 is closed so that the display 12 rests on the mainframe 11. When the display 12 is pressed downwardly, the projections 22 displace upwardly along the key slots 121, bringing the toothed blocks 2 to displace outwardly, further causing the gears 4 engaging therewith to translate to a position as shown in FIG. 3*b* as a result of the sub-keyboards 3 being checked by the stop posts 22. With the continual upward displacement of the projections 22, the toothed blocks 2 continue to engage the gears 4, while the sub-keyboards 3 are freed from the restriction imposed thereon by the stop posts 113 and may turn to a position as shown in FIG. 3*c*. The sub-keyboards 3 are therefore closed upon the mainframe 1 in a parallel relationship. To open the sub-keyboards 3 again, it is only necessary to lift up the display 12 so that the above-mentioned mechanism works in a reverse direction.

In summary, the keyboard structure according to the present invention allows the overall size of the keyboard as well as the size of the individual keys to increase by means of the arrangement of the two sub-keyboards 3. Hence, problem with conventional keyboards for portable computers is eliminated. Even the standard 101 computer keyboard for desk-top personal computers may be adapted to form the sub-keyboards 3 of the invention. The present invention indeed a breakthrough in the field.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved portable computer of the type consisting of a mainframe, a display and a keyboard, said improvement comprising:

a means for connecting said keyboard to said mainframe and imparting rotary motion to said keyboard, and said keyboard consisting of two sub-keyboards mounted on said mainframe and capable of being opened outwardly to be in a longitudinally aligned state or closed inwardly to be in a parallel relationship, wherein said means consists of two depressions formed in an upper side of said mainframe, each of said depressions having a shaft hole in a bottom side thereof; two toothed blocks near a pivot connecting said display and said mainframe, said toothed blocks being respectively provided with an array of teeth at a position near said depressions, a projection being disposed at an upper end of each of said toothed blocks, said display being provided with two key slots respectively disposed on either side of the pivot for receiving said projections of said toothed blocks;

and two gears provided on the respective bottom sides of said sub-keyboards, said gears respectively having a gear ring of a size matching that of said depressions and a plurality of teeth matching said teeth of said toothed blocks, said gears further respectively having a shaft of a diameter matching that of said shaft holes and being connected to a motherboard of the computer, whereby said gear shafts and said gear rings of said gears are respectively disposed in said shaft holes and said depressions in said mainframe and said teeth of said gears engage with said teeth of said toothed blocks to enable said sub-keyboards to rotarily turn on said mainframe.

2. An improved portable computer as claimed in claim 1, wherein said depressions and said shaft holes are preferably elongated in shape with their ends configured to be hemispherical.

3. An improved portable computer as claimed in claim 1, wherein said key slots of said display preferably extend obliquely upward from both sides of the pivot.

4. An improved portable computer as claimed in claim 1, wherein said mainframe is provided with a plurality of stop posts near the pivot.

\* \* \* \* \*